(12) United States Patent
Carr

(10) Patent No.: US 7,447,902 B2
(45) Date of Patent: *Nov. 4, 2008

(54) METHOD FOR PROCESSING MULTIPLE WIRELESS COMMUNICATIONS SECURITY POLICIES

(75) Inventor: Jeffrey D. Carr, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,919

(22) Filed: Oct. 31, 2006

(65) Prior Publication Data

US 2007/0050617 A1 Mar. 1, 2007

Related U.S. Application Data

(63) Continuation of application No. 10/053,904, filed on Jan. 24, 2002, now Pat. No. 7,174,452.

(60) Provisional application No. 60/263,793, filed on Jan. 24, 2001, provisional application No. 60/272,965, filed on Mar. 2, 2001.

(51) Int. Cl.
*H04L 9/00* (2006.01)

(52) U.S. Cl. .................. 713/153; 713/151; 713/160; 713/161; 713/166; 726/14; 380/37; 380/255; 380/270

(58) Field of Classification Search ............... 713/153
See application file for complete search history.

(56) References Cited

U.S. PATENT DOCUMENTS 5,598,410 A 1/1997 Stone 6,389,468 B1 5/2002 Muller et al.
6,484,257 B1 11/2002 Ellis
6,708,218 B1 3/2004 Ellington et al.

FOREIGN PATENT DOCUMENTS

| EP | 0 903 886 | 3/1999 |
|---|---|---|
| EP | 0 908 810 | 4/1999 |
| WO | WO 01/05086 | 1/2001 |
| WO | WO 01/05089 | 1/2001 |

OTHER PUBLICATIONS

Zhang, Yongguang, 'A Multi-Layer IP Security Protocol for TCP Performance Enhancement in Wireless Networks' IEEE Journal on Selected Areas in Communications, 2004, entire document, http://www.cse.psu.edu/~gcao/teach/514/jsac04.pdf.*

(Continued)

*Primary Examiner*—Kristine Kincaid
*Assistant Examiner*—Ronald Baum
(74) *Attorney, Agent, or Firm*—Sterne Kessler Goldstein & Fox, p.l.l.c.

(57) ABSTRACT

A method for processing wireless data packets allows for processing packets allows consolidation of security processing. Security processing is performed in accordance with multiple security policies. This processing is done in a single front end processing block. Different security processes can be performed in parallel. Processing overhead is reduced by eliminating the need to redundantly check packet characteristics to assess the different security requirements imposed by security policies. Further, the present invention also substantially reduces the CPU cycles required to transport data back and forth from memory to a cryptographic coprocessor.

15 Claims, 13 Drawing Sheets

OTHER PUBLICATIONS

Nahum et al. "Parallelized Network Security Protocols," *Proceedings of the Symposium on Network and Distributed System Security*, IEEE, Feb. 1996, pp. 145-154.

International Search Report for International Application No. PCT/US02/01957, International Filing Date: Jan. 24, 2002.

* cited by examiner

METHOD FOR PROCESSING MULTIPLE WIRELESS COMMUNICATIONS SECURITY POLICIES

CROSS-REFERENCE TO RELATED APPLICATIONS

This application is a continuation of and claims priority to U.S. Non-Provisional Patent Application Ser. No. 10/053,904, filed Jan. 24, 2002 ('904 Patent Application.), which is incorporated herein by reference in its entirety. The '904 application in turn claims priority to U.S. Provisional Application 60/263,793 (filed Jan. 24, 2001) and 60/272,965 (filed Mar. 2, 2001), both of which are incorporated herein by reference in their entirety.

BACKGROUND OF THE INVENTION

1. Field of the Invention

The invention described herein relates to information security and network throughput.

2. Background Art

Packet based networks using an open architecture such as, for example, the Internet Protocol (IP) provide a highly efficient and flexible communication medium for local and global communicators. However, the Internet Protocol and other network layer protocols are vulnerable to security risks that complicate their use in business and other applications that involve the communication of confidential data. Therefore, security has become an essential element of the Internet infrastructure and has increasingly become a limiting factor in terms of network throughput and latency.

A number of security solutions have been developed to enable new types of opportunities over packet based networks. Often data packets transmitted to a network device have security measures applied at multiple communication layers. For example, security processes for encryption and authentication may be applied at the (a) media access (MAC)/data-link layer, (b) network layer (e.g. Internet Protocol), (c) transport layer and (d) application layers.

At an endpoint of a conventional network, a network device completely descrambles an incoming data packet before processing or using the data. In most cases multiple security processing stages are required to assess security policies and, when required, apply security algorithms. Processing through each of these stages increases the overhead of security policy assessment and the overhead of passing data across a system bus from memory to the central processing unit (CPU) and possibly to a hardware cryptographic coprocessor.

Therefore, it would be advantageous to merge the processing required by the security policies at each stage into a single front end processing function.

BRIEF SUMMARY OF THE INVENTION

In one aspect of the invention, a method for processing wireless packets allows consolidation of security processing. Security processing is performed in accordance with multiple security policies. This processing is done in a single front end processing block. Different security processes can be performed in parallel. The present invention reduces processing overhead by eliminating the need to redundantly check packet characteristics to assess security requirements based on security policies. Further, the present invention also substantially reduces the CPU cycles required to transport data back and forth from memory to a cryptographic coprocessor.

BRIEF DESCRIPTION OF THE DRAWINGS/FIGURES

These and other features, aspects, and advantages of the present invention will become better understood with regard to the following description, appended claims, and accompanying drawings, in which:

Figure 4:
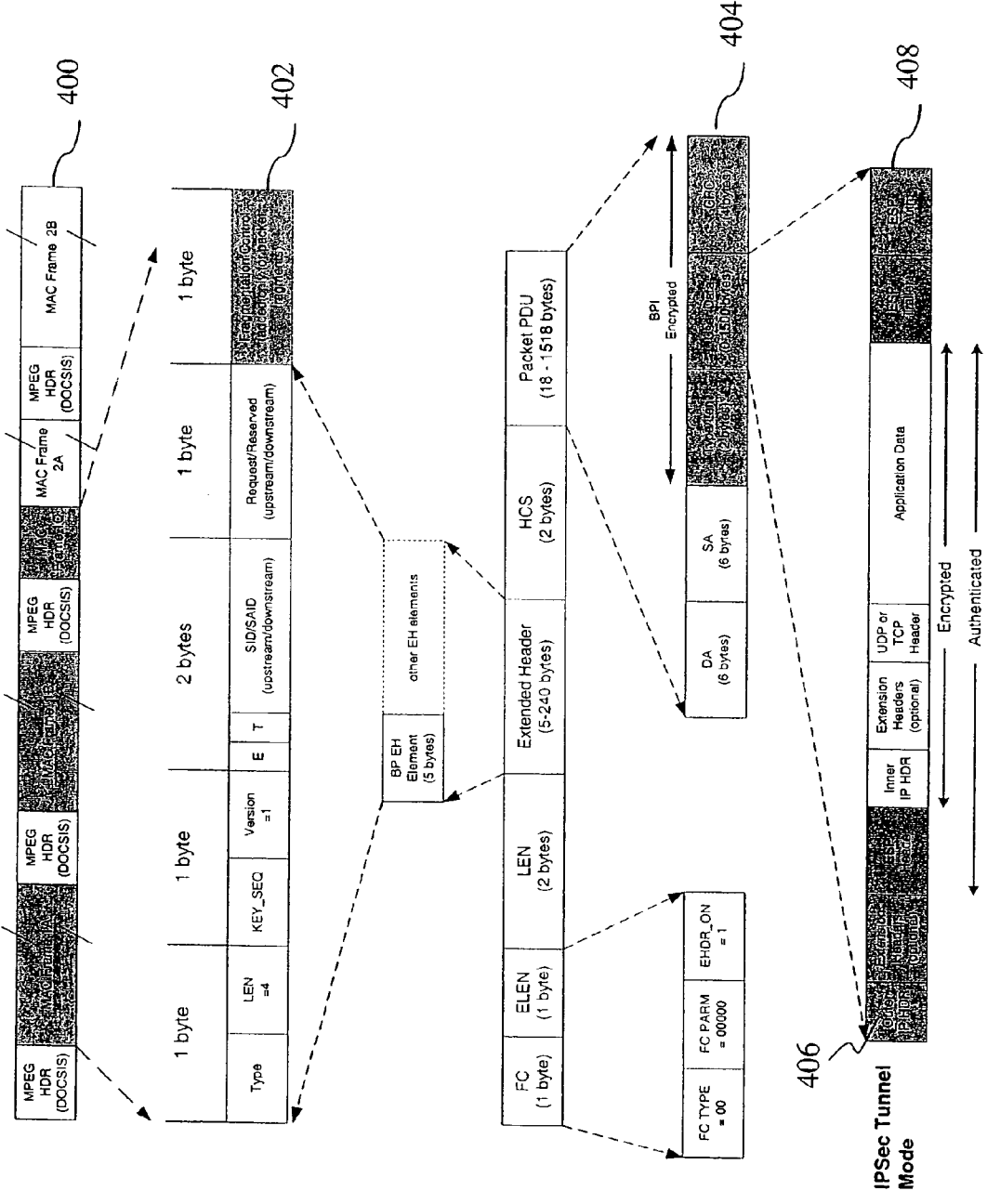
FIG. 4 is a graphical illustration of the layers of a DOCSIS MAC having IPSec applied in accordance with an exemplary embodiment of the present invention.
Figure 6:
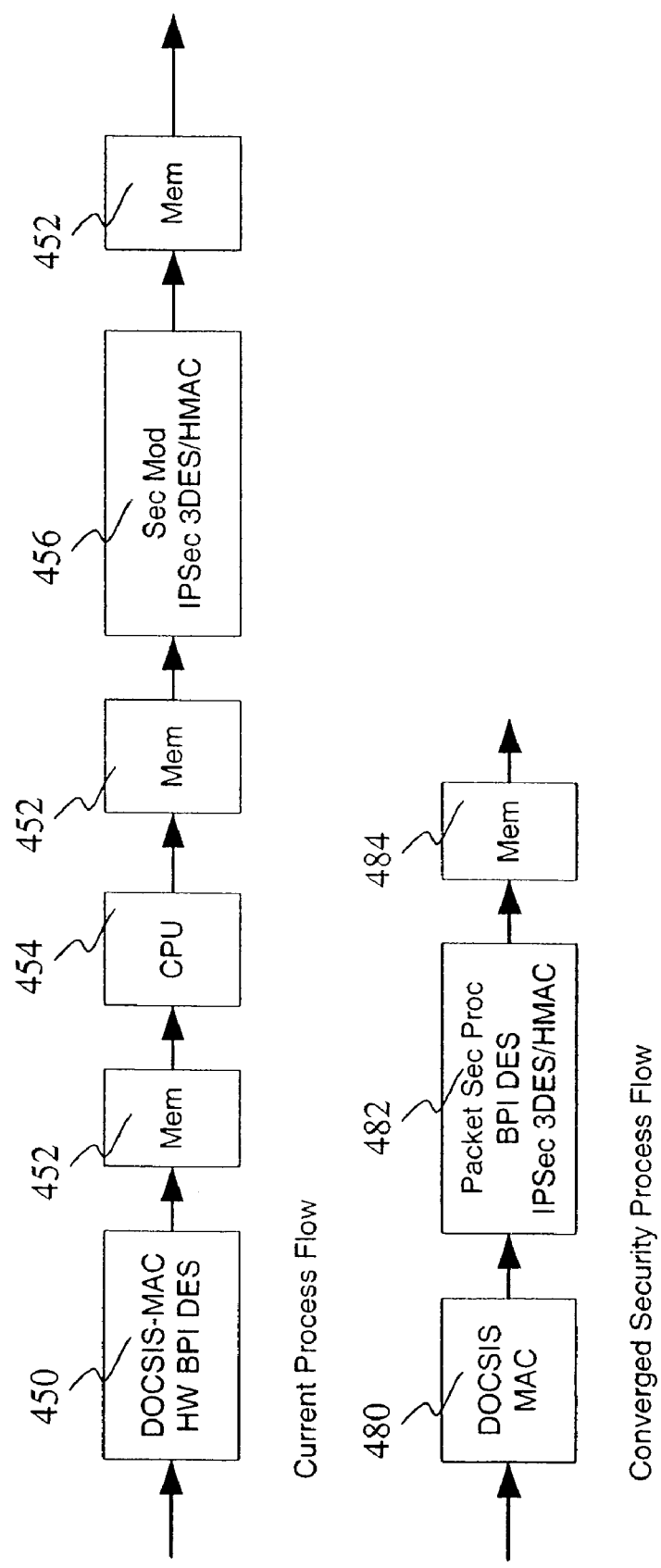
Figure 7:
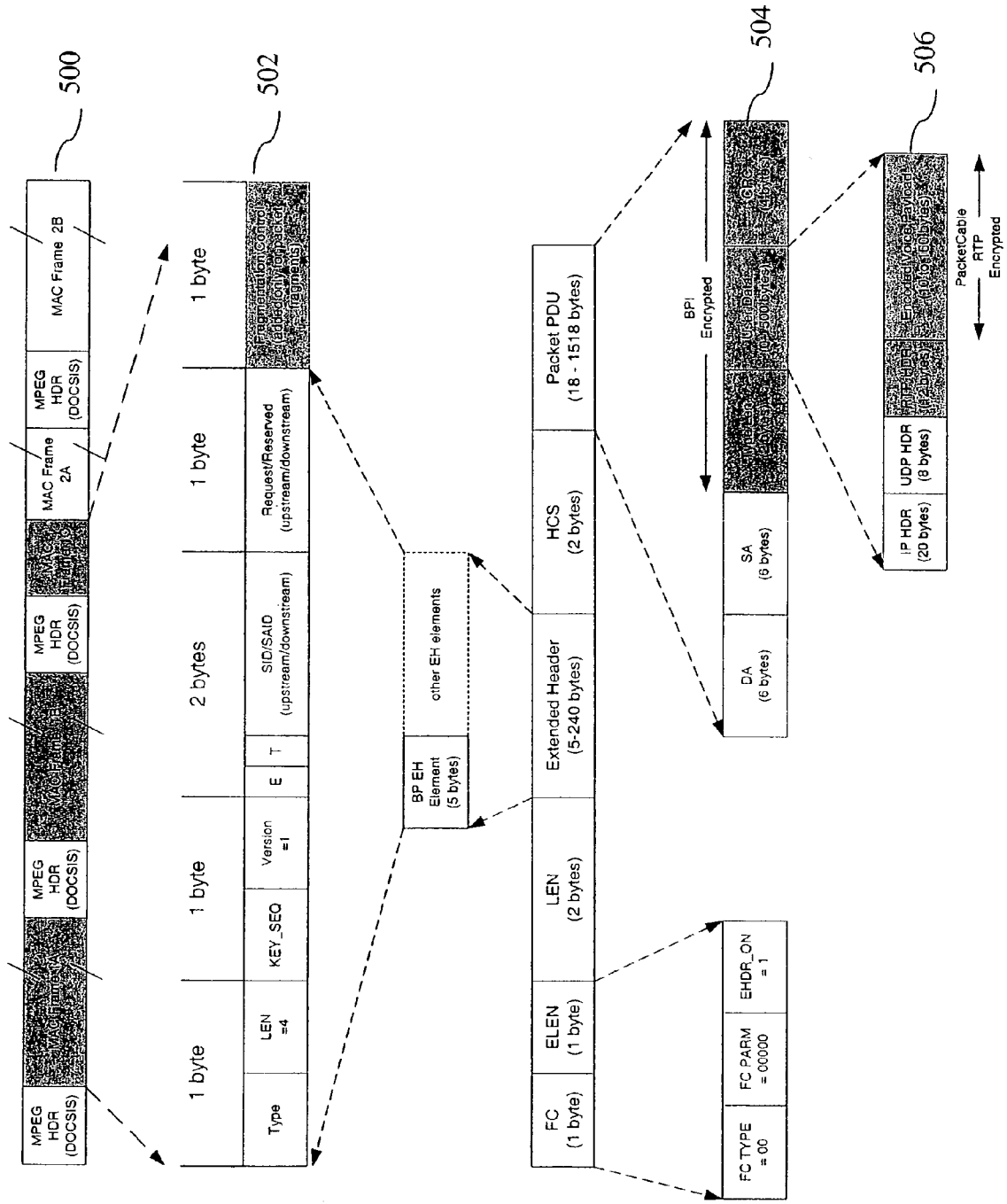
Figure 8:
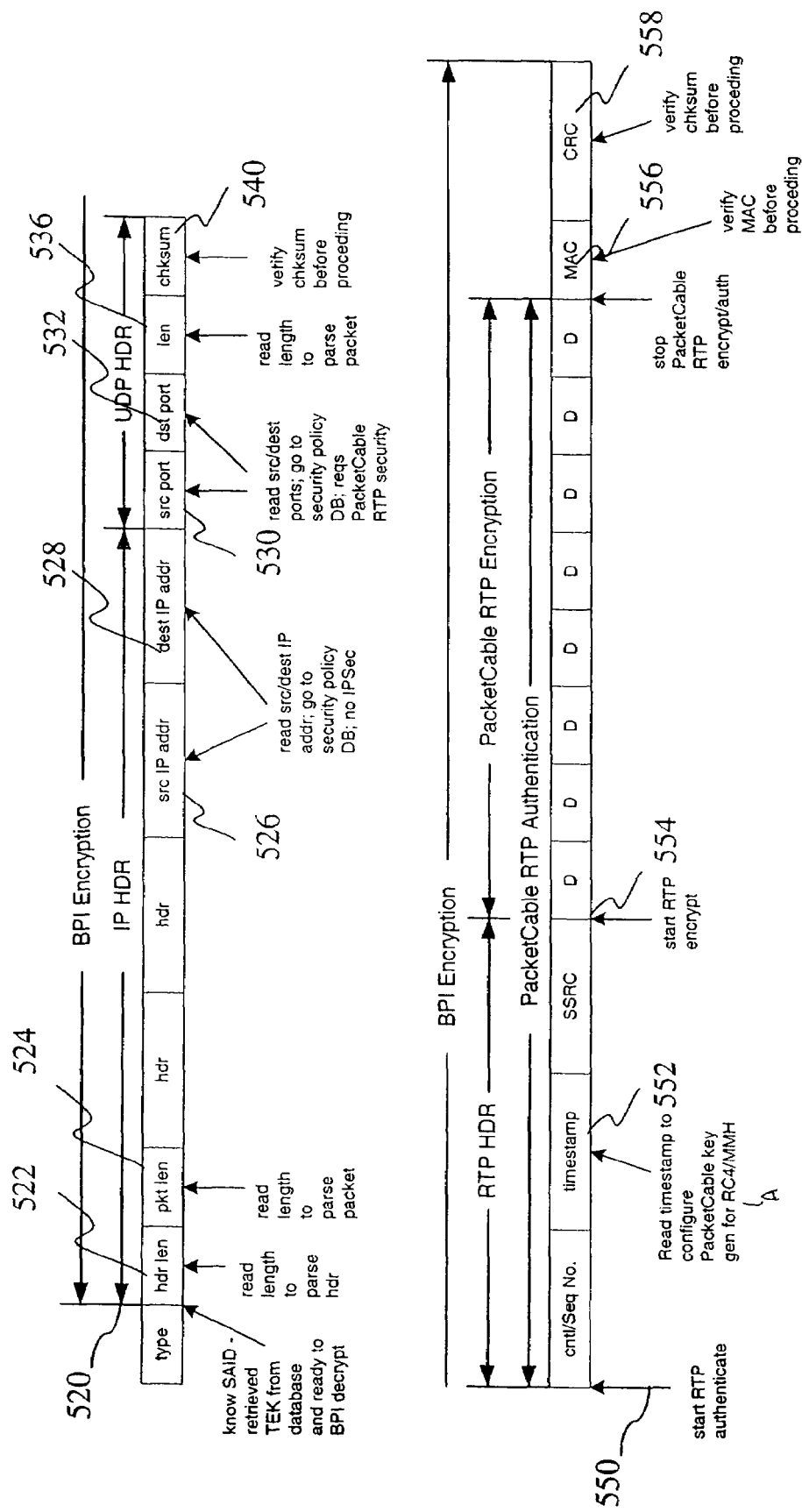
Figure 9:
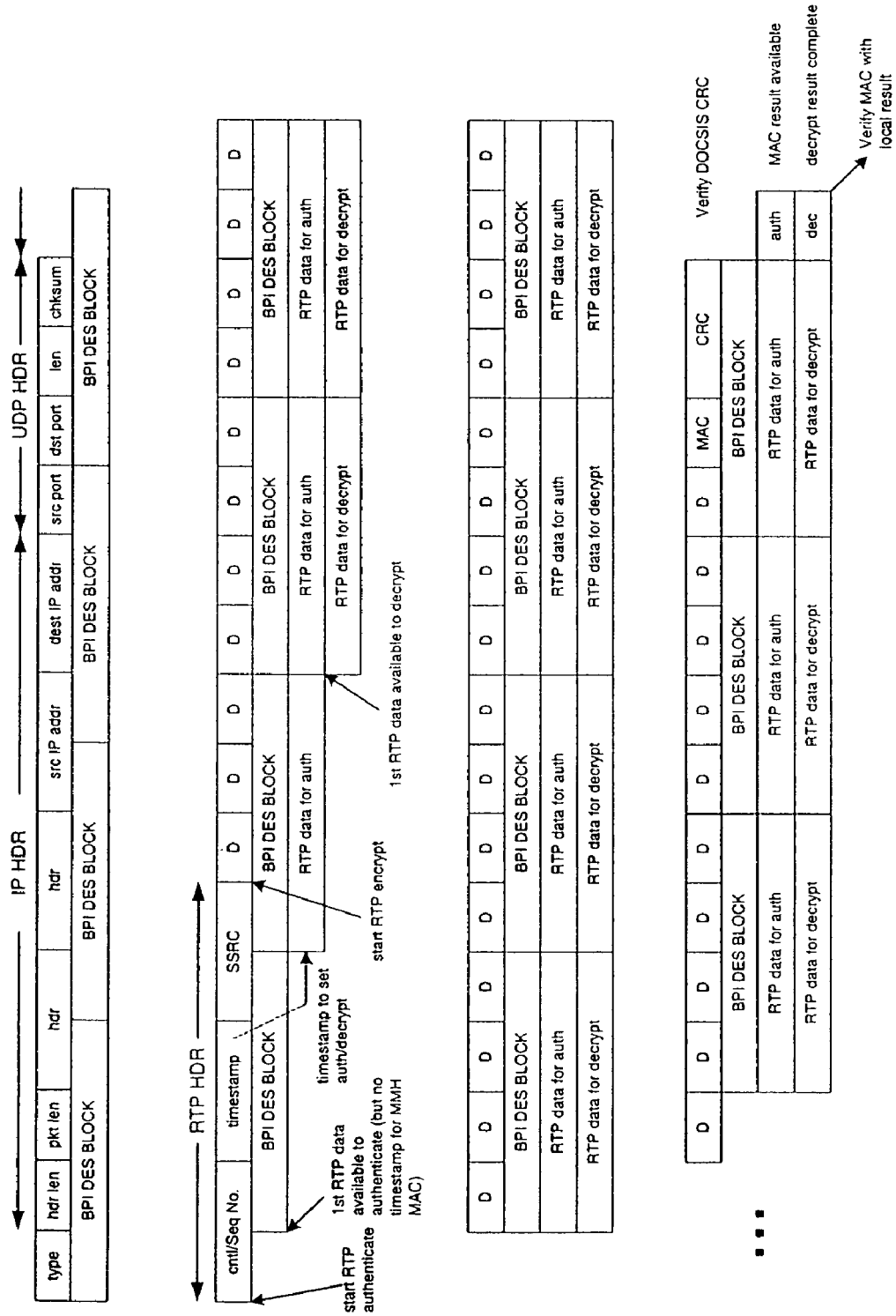
Figure 10:
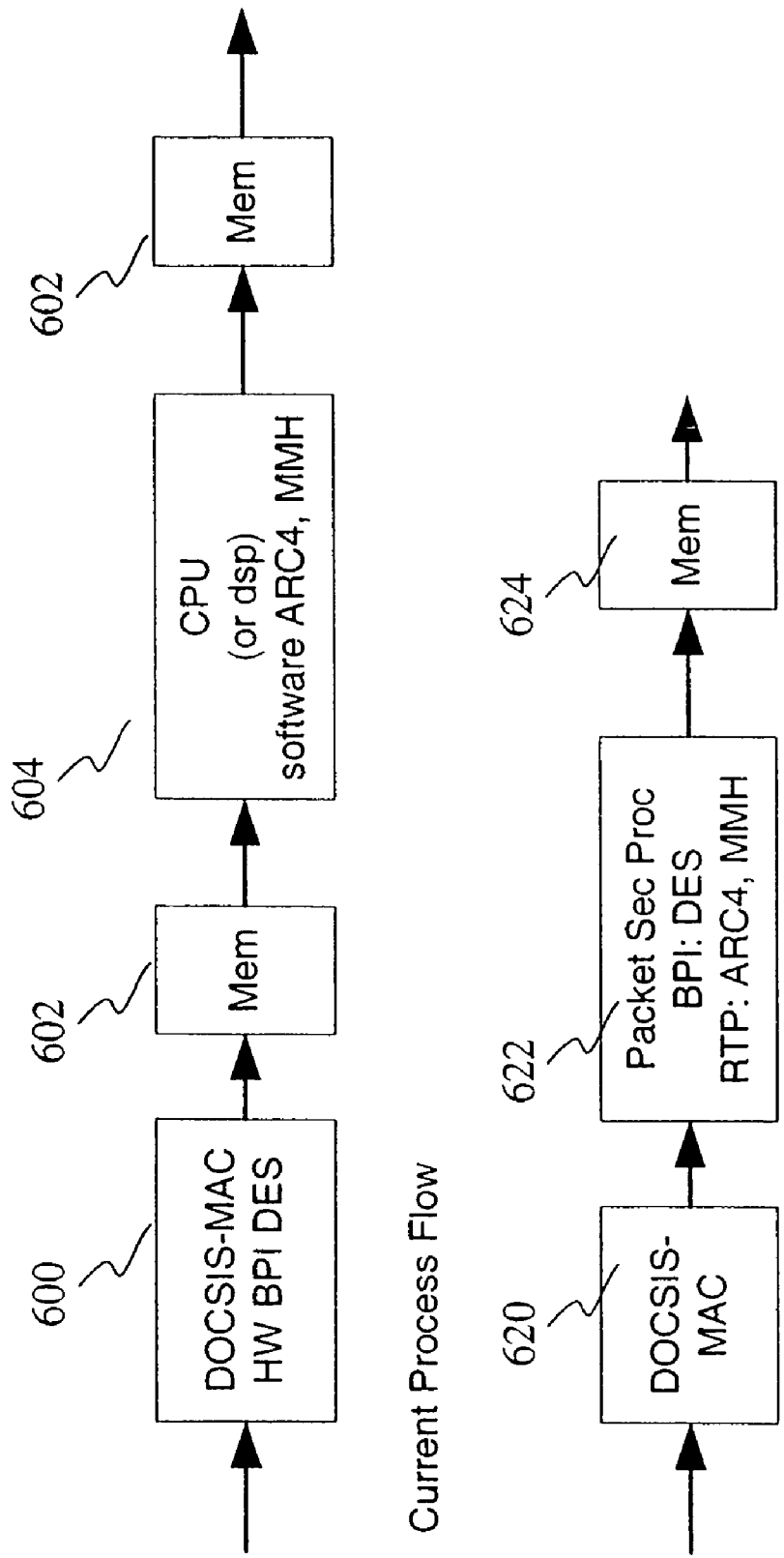
Figure 11:
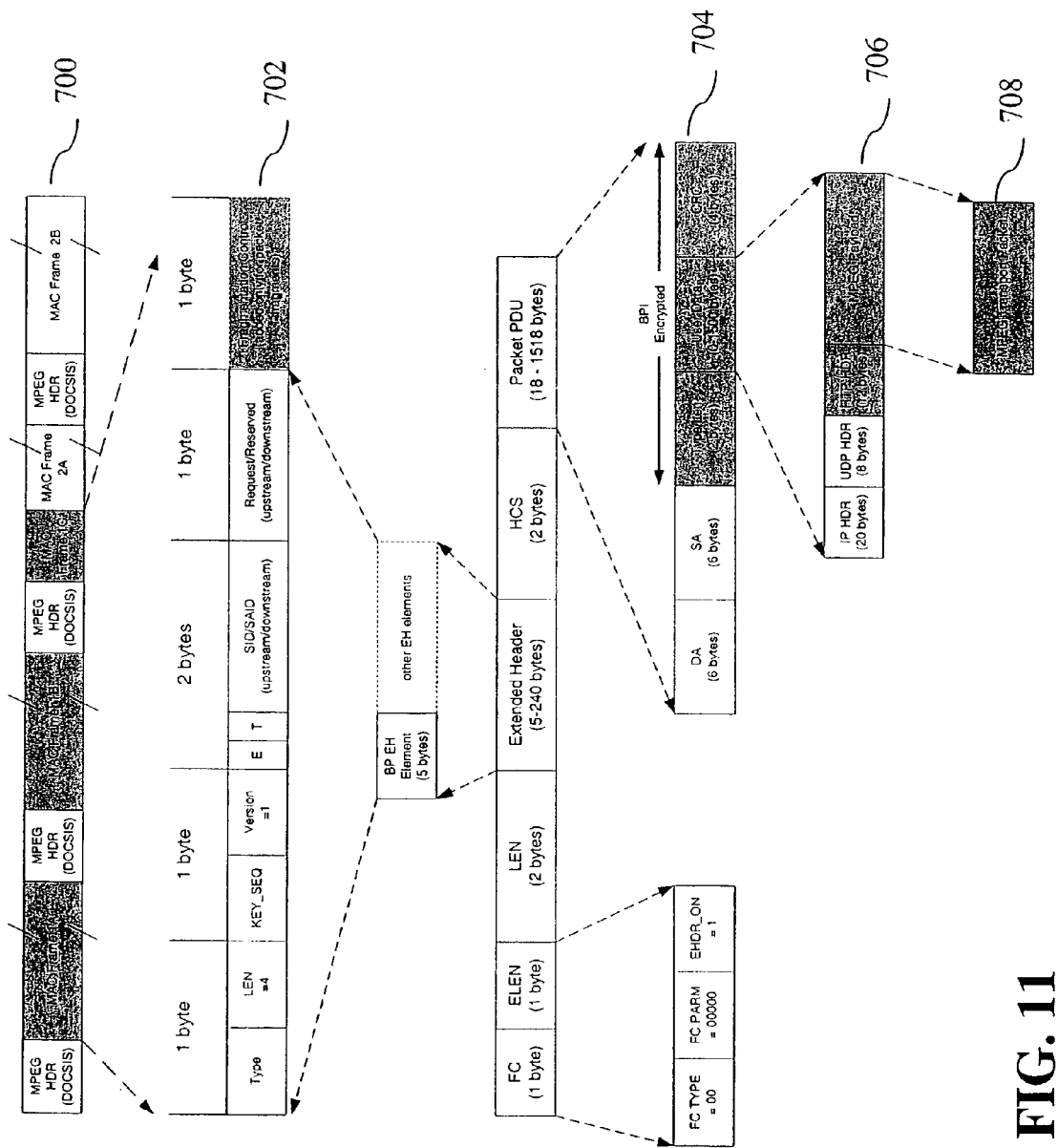
Figure 12:
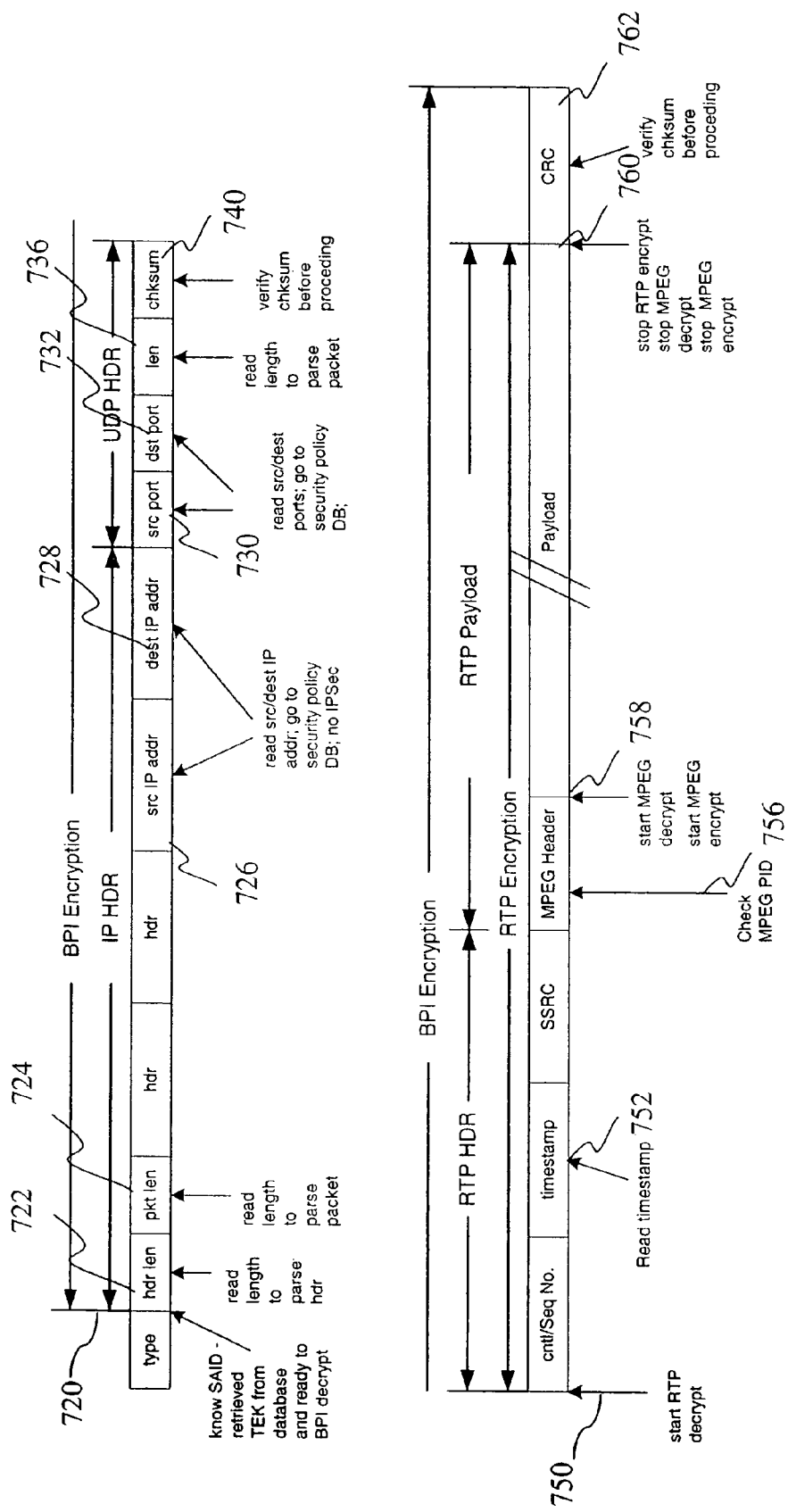
Figure 13:
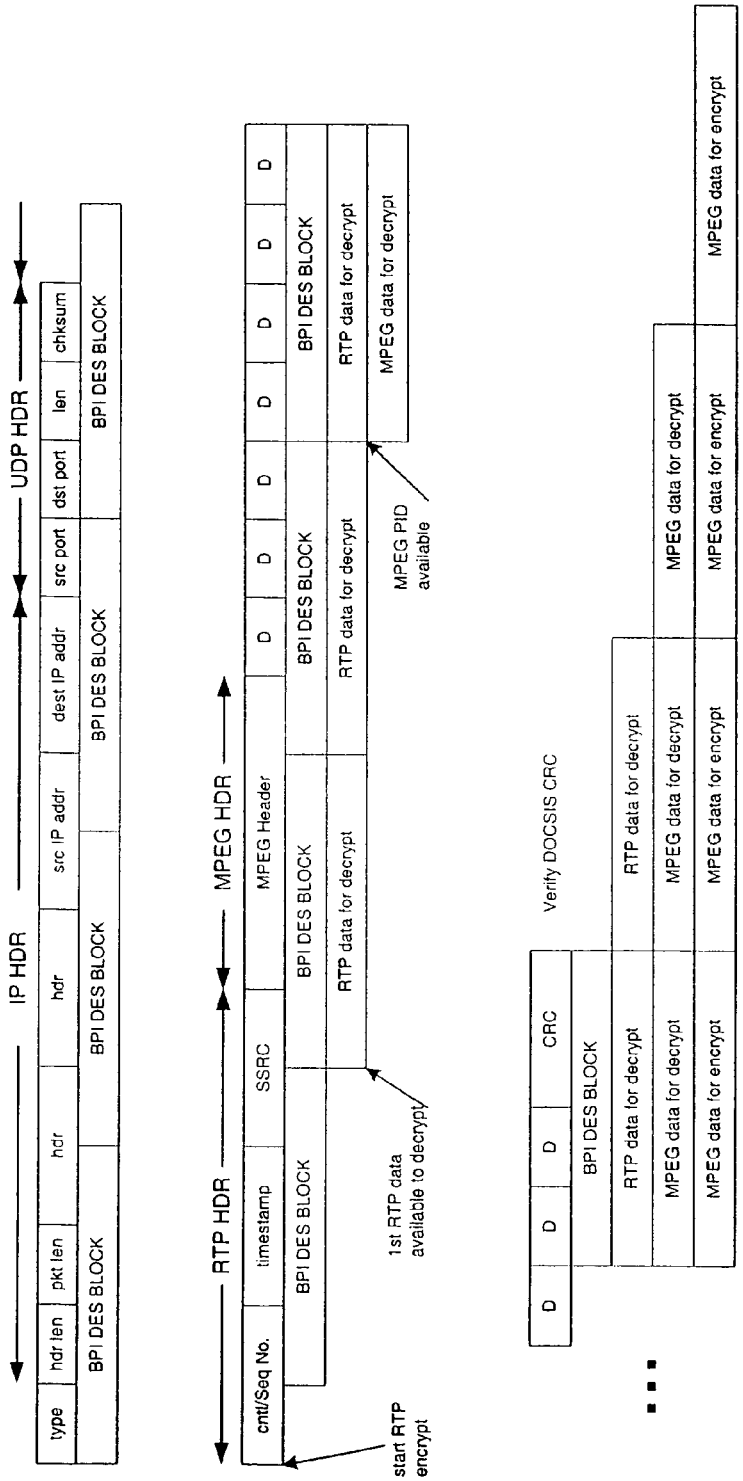

FIG. 6 graphically illustrates the data flow and security processing for a conventional system and for a merged front end packet security processor for the packet of FIG. 4, in accordance with an exemplary embodiment of the present invention;

FIG. 7 is a graphical illustration of the layers of a VoIP packet having RTP security applied at the application layer in accordance with an exemplary embodiment of the present invention;

FIG. 8 is a graphical illustration of a method for parallel processing of the security policies applied to the packet in FIG. 7 in accordance with an exemplary embodiment of the present invention;

FIG. 9 is a further graphical illustration of the method for parallel processing of the security policies applied to the packet in FIG. 7 in accordance with an exemplary embodiment of the present invention;

FIG. 10 graphically illustrates the data flow and security processing for a conventional system and for a merged front end packet security processor for the packet of FIG. 7, in accordance with an exemplary embodiment of the present invention;

FIG. 11 is a graphical illustration of the layers of a IP video packet on a DOCSIS network, with MPEG encryption in accordance with an exemplary embodiment of the present invention;

FIG. 12 is a graphical illustration of a method for performing parallel decryption and encryption on the packet in FIG. 11 in accordance with an exemplary embodiment of the present invention; and FIG. 13 is a further graphical illustration of a method for performing parallel encryption and decryption on the packet in FIG. 11 in accordance with an exemplary embodiment of the present invention.

DETAILED DESCRIPTION OF THE INVENTION

An exemplary embodiment of the present invention provides a method and apparatus for merging the security policies required at each communication layer into a single front end processing block. In order to appreciate the advantages of the present invention, it will be beneficial to describe the invention in the context of an exemplary bi-directional communication network, such as for example, a Data Over Cable System Interface Specification (DOCSIS) compatible network gateway or cable modem.

Figure 1:
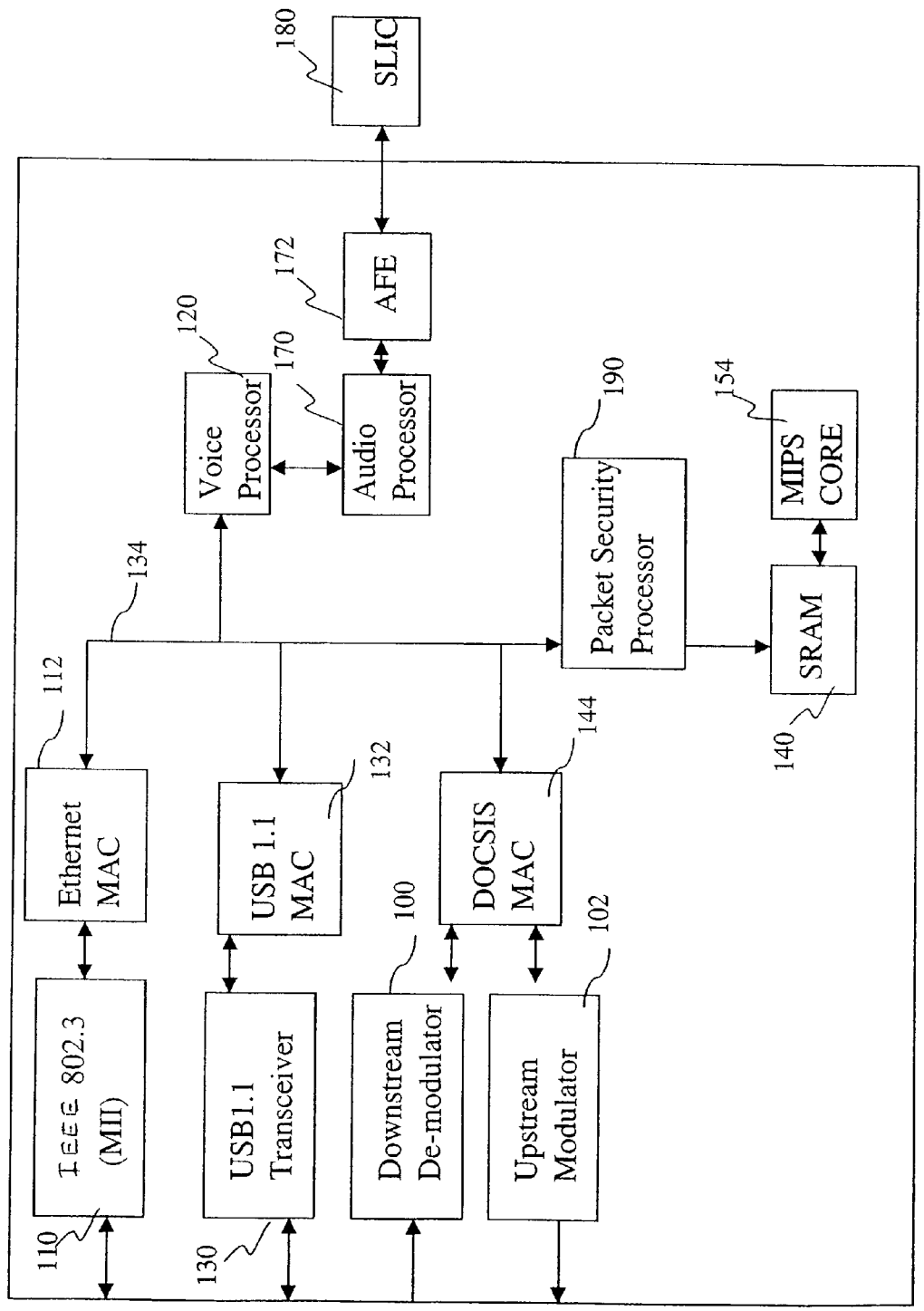
FIG. 1 is a block diagram of a network gateway in accordance with an exemplary embodiment of the present invention.

An exemplary embodiment of the network gateway is shown schematically in FIG. 1. The described exemplary embodiment may provide an integrated, DOCSIS compliant, single chip solution, as disclosed in U.S. patent application Ser. No. 09/548,400, entitled "GATEWAY WITH VOICE" and filed Apr. 13, 2000, the content of which is incorporated herein by reference as if set forth in full. DOCSIS was developed to ensure that cable modem equipment built by a variety of manufacturers is compatible, as is the case with traditional dial-up modems. The described exemplary embodiment can provide integrated functions for communicating with a cable modem termination system (CMTS) (not shown). For example, a quadrature phase shift key (QPSK) upstream modulator 102 transmits data to a far end data terminating device via the CMTS, and a quadrature amplitude modulation (QAM) downstream demodulator 100 receives data from a far end data terminating device via the CMTS.

In addition, the described exemplary embodiment can support multiple inputs in accordance with a variety of protocols. For example, an IEEE 802.3 compliant media independent interface (MII) 110 in conjunction with an Ethernet MAC 112 provide bi-directional data exchange between devices such as, for example, a number of personal computers (PCs) and/or Ethernet phones, and a far end data terminating device. A voice and data processor 120 is used for processing and exchanging voice, as well as fax and modem data between packet based networks and telephony devices.

The described exemplary embodiment of the network gateway includes a full-speed universal serial bus (USB) transceiver 130 and USB MAC 132 which is compliant with the USB 1.1 specification for transparent bi-directional IP traffic between devices operating on a USB (such as a PC workstation, server printer, or other similar device) and the far end data terminating device.

Additionally, the USB MAC 132 provides concurrent operation of control, bulk, isochronous and interrupt endpoints. The USB MAC 132 also can support standard USB commands as well as class/vendor specific commands. The USB MAC 132 may include integrated random access memory (RAM) that allows flexible configuration of the device.

Two way communication of information to a device operating on a USB can be provided, such as a PC on a USB 1.1 compliant twisted pair. The USB MAC 132 can be arranged for hardware fragmentation of higher layer packets from USB packets with automatic generation and detection of zero length USB packets. The USB MAC 132 may include direct memory access (DMA) channels which are used to communicate received data to the system memory 140 via the internal system bus (ISB) 134. Data stored in system memory 140 may then be processed and communicated to the cable modem termination system via the DOCSIS MAC 144 and the upstream modulator 102. Similarly, data that is received from the cable modem termination system, processed by the downstream demodulator 100, and stored in system memory as higher layer packets can be retrieved by the USB MAC 132 via the ISB 134 and assembled into USB packets with automatic generation of zero length USB packets. USB packets may then be communicated to the external device operating on the USB via the USB transceiver 130.

The media independent interface 110 can provide bi-directional communication with devices such as for example a personal computer operating on an Ethernet. The media independent interface 110 can forward data to and receive information from the Ethernet MAC 112. The Ethernet MAC 112 can also perform all the physical layer (PHY) interface functions for 100BASE-TX full duplex or half-duplex Ethernet as well as 10BASE-T full or half duplex. The Ethernet MAC 112 may also perform additional management functions such as link integrity monitoring, etc.

The voice processor 120 processes and transports voice-over-packet based networks, such as PCs running a network on a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Networks such as TDMA (IS-13x), CDMA (IS-9x) or Global System for Mobile Communications (GSM) for terrestrial wireless applications, or any other packet based system. The described embodiment of the voice processor 120 also supports the exchange of voice, as well as fax and modem, between a traditional circuit switched network (or any number of telephony devices) and the CMTS. The voice processor may be implemented with a variety of technologies including, by way of example, embedded communications software that enables transmission of voice over packet based networks.

The voice processor 120 can include a grant synchronizer that insures timely delivery of voice signals to a MIPS core 154 for upstream transmission. In addition, a pulse code modulation (PCM) interface (not shown) can provide the voice processor 120 with an interface to an internal audio processor 170 as well as external audio processing circuits to support constant bit rate (CBR) services such as telephony. The PCM interface can provide multiple PCM channel controllers to support multiple voice channels. In the described exemplary embodiment of the gateway, there are four sets of transmit and receive first-in-first-out (FIFO) registers, one for each of the four PCM controllers. However, the actual number of channels that may be processed may vary and is limited only by the DSP. The internal system bus 134 is used to transfer data, control, and status messages between the voice processor 120 and the MIPS core 154. FIFO registers are preferably used in each direction to store data packets.

The described exemplary embodiment of the gateway includes an internal audio processor 170 with an analog front end (AFE) 172 that interfaces the voice processor 120 with external subscriber line interface circuits (SLICs) 180 for bi-directional exchange of voice signals. The audio processor 170 may include programmable elements that implement filters and other interface components for a plurality of voice channels. In the transmit mode the analog front end 172 accepts an analog voice signal, digitizes the signal, and forwards the digitized signal to the audio processor 170.

The audio processor 170 decimates the digitized signal and conditions the decimated signal to remove far end echos. The audio processor 170 can apply a fixed gain/attenuation to the conditioned signal and forwards the gain adjusted signal to the voice processor 120 via the PCM interface (not shown). In the receive mode the audio processor 170 accepts a voice signal from the PCM interface and preferably applies a fixed gain/attenuation to the received signal.

The gain adjusted signal is then interpolated from 8 kilohertz (kHz) to 96 kHz before being digital/analog (D/A) converted for communication via SLIC interface 180 to a telephony device.

The QAM downstream demodulator 100 may utilize either 64 QAM or 256 QAM in the 54 to 860 megahertz (MHz) bandwidth to interface with the CMTS. The QAM downstream demodulator 100 accepts an analog signal centered at the standard television frequencies, and amplifies and digitizes the signal with an integrated programable gain amplifier and A/D converter, respectively. The digitized signal is demodulated with recovered clock and carrier timing. Matched filters and then adaptive filters remove multi-path propagation effects and narrowband co-channel interference. Soft decisions are then passed off to an ITU-T J.83 Annex A/B/C compatible decoder. The integrated decoder performs error correction and forwards the processed received data, in either parallel or serial Moving Pictures Expert Group (MPEG)-2 format, to DOCSIS Media Access Controller 144.

The DOCSIS MAC 104 may include robust frame acquisition and multiplexing with MPEG-2 compliant video and audio streams. The DOCSIS MAC 104 extracts DOCSIS MAC frames from MPEG-2 frames, processes MAC headers, and filters and processes messages and data.

The upstream modulator 102 provides an interface with the CMTS. The upstream modulator 102 may be configured to operate with numerous modulation schemes including QPSK and 16-QAM. The upstream modulator 102 supports bursts or continuous data, provides forward error correction (FEC) encoding and pre-equalization, filters and modulates the data stream, and provides a direct 0-65 MHz analog output.

The DOCSIS MAC 144 can also implement the upstream portions of the DOCSIS protocol before transmission by the upstream modulator 102. The DOCSIS MAC 144 receives data from one of the DMA channels, requests bandwidth, and frames the data for time division multiple access (TDMA) with other modems on the same upstream frequency.

The upstream modulator 102 and the downstream demodulator 100 are controlled by a MIPS core 154 having a high performance CPU operating at a speed of at least 80 MHz with 32-bit address and data paths, via a serial interface which is compatible with a subset of the Motorola M-Bus and the Philips 12C bus. The interface consists of two signals, serial data (SDA) and serial clock (SCL), which may control a plurality of devices on a common bus. The addressing of the different devices may be accomplished in accordance with an established protocol on the two wire interface.

Figure 2:
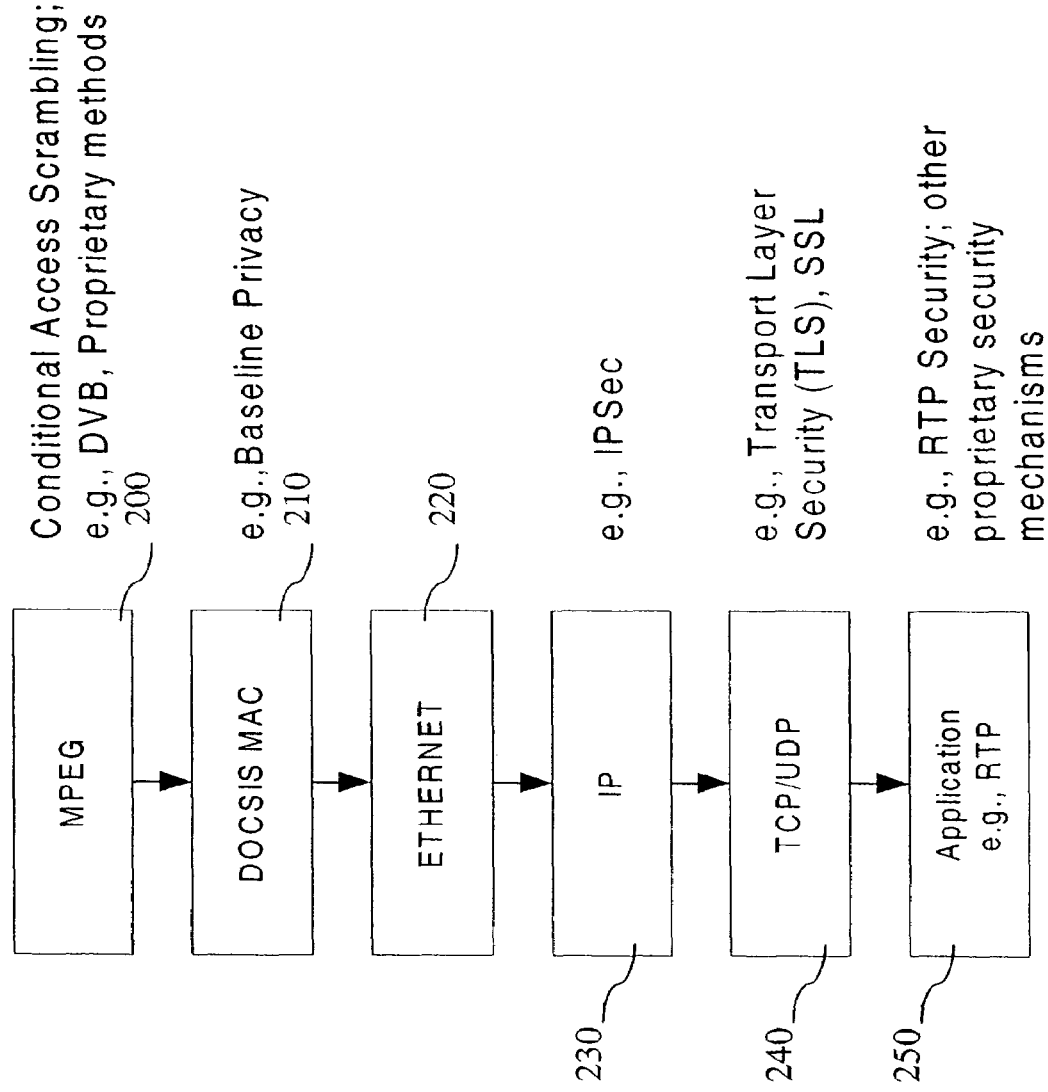
FIG. 2 is a graphical illustration of the hierarchy of a typical data packet along with the security most often applied at particular layers.

The network gateway may be vulnerable to network breaches. Therefore, Internet appliances such as the described network gateway apply a plurality of security processes to a data packet at various communication layers. In conventional systems, security protocols applied at the various layers are processed in a serial fashion, wherein each layer is separately processed prior to initiating the processing of the next layer. For example, FIG. 2 illustrates a hierarchy for a typical data packet along with the security most often applied at a particular layer. The first layer of security may be at the MPEG transport layer 200. If a video packet, the transport packet may be scrambled by a video conditional access scrambler such as the digital video broadcast (DVB) standard's common scrambling mechanism. Often this is all the security applied to a video MPEG transport packet. If the MPEG packet is a DOCSIS MPEG packet (i.e. packet identifier (PID)=0x1FFE), as in the case of packets received by the downstream demodulator of the described network gateway, then DOCSIS baseline privacy may be applied at the DOCSIS MAC layer 210.

In conventional systems, MPEG conditional access scrambling and DOCSIS MAC layer baseline privacy scrambling are often implemented in hardware, typically in separate locations of the network device and do not share security processing resources other than the host MIPS core. Conventionally, once past the Ethernet packet layer 220, the packet is forwarded to a software IP stack on the MIPS core where additional layers of security processing for the network layer 230, transport layer 240 and application layer 250 are typically managed in software by the MIPS core as the packet is serially processed up the packet hierarchy to the application layer. Cryptographic functions may be executed in software or in hardware by way of a shared cryptographic coprocessor. However, for conventional systems that utilize a cryptographic coprocessor, significant overhead in the form of delays and MIPS core cycles are required to share data across the system bus, between memory and the cryptographic coprocessor and back again.

The described exemplary embodiment utilizes the common characteristics of a packet and values within a packet to merge the security policies required at each stage into a single front-end processing block. Advantageously, the present invention enables parallel security processing of the plurality of security protocols applied at the various layers. In the described exemplary embodiment, merged security processing is applied in accordance with established network security policies. The security policies vary in complexity. For example, the Internet Engineering Task Force's IP Security (IPSec) specifications have made the definition and management of complex security policies a key component of the IPSec solution.

Further, the elimination of redundant determinations of packet characteristics to assess security requirements based on security policy and the elimination of the CPU cycles required to exchange data between memory and cryptographic coprocessors increases the operating efficiency and network throughput while also reducing system latency. The following list defines examples of security policies and pertinent characteristics used to assess the security requirements for the previously mentioned security algorithms. In these examples, the identifier SPx is used to indicate a security policy. A security policy is defined by its SPx value, input selectors, and security requirement.

MPEG Conditional Access

MPEG video packets include a packet identifier (PID) that may be enabled for conditional access (CA) scrambling. The PID specifies a key that may be used to descramble the packet. Further, one or more transport streams (TS) may be processed. Therefore, the packet contains an identifier for the number of transport streams to be processed. It is assumed that a single transport stream will only have a single conditional access scrambling type applied. Normally, for packet filtering, the action to be taken is either implied by design, or stored in PID registers on the transport chip.

| Policy | TS | PID | Direction | Action | Comment |
|---|---|---|---|---|---|
| $SP_1$ | $TS_1$ | $PID_1$ | inbound | DVB scrambling | DVB CA |
| $SP_1$ | $TS_1$ | $PID_2$ | inbound | DVB scrambling | DVB CA |
| ... | | | | | |
| $SP_m$ | $TS_1$ | $PID_n$ | inbound | DVB scrambling | DVB CA |
| $SP_{m+1}$ | $TS_2$ | $PID_1$ | inbound | PowerKey scrambling | PowerKey CA |
| $SP_{m+2}$ | $TS_2$ | $PID_2$ | inbound | PowerKey scrambling | PowerKey CA |
| ... | | | | | |
| $SP_{m+p}$ | $TS_2$ | $PID_n$ | inbound | PowerKey scrambling | PowerKey CA |
| $SP_x$ | $TS_3$ | 0x1FFE | inbound | pass-thru | DOCSIS packet |

Baseline Privacy

MPEG packets may further include MAC data that has been encrypted in accordance with the baseline privacy (BPI) link encryption standard, which calls for encryption using the Data Encryption Standard (DES) algorithm. Packets containing MAC data are identified by a unique packet identifier. The type of filtering to be applied to the packet may be determined by information contained in the MAC header. For example, if a packet supports baseline privacy the packet will be filtered in accordance with an appropriate security association identifier (SAID) included in the MAC header. Again, for packet filtering the action to be taken is normally either implied by design, or stored in security ID (SID)/SAID registers on the transport chip.

| Policy | TS | SID | SAID | Direction | Action |
|---|---|---|---|---|---|
| $SP_1$ | $TS_1$ | * | $SAID_1$ | inbound | BPI DES |
| $SP_2$ | $TS_1$ | * | $SAID_2$ | inbound | BPI DES |
| $SP_m$ | $TS_1$ | * | $SAID_n$ | inbound | BPI DES |
| $SP_{m+1}$ | $TS_1$ | * | * | outbound | BPI DES, use $SAID_1$ traffic encryption key (TEK) |

IPSec

In addition, Internet protocol security (IPSec) may be applied at the IP layer. IPSec specifications have made the definition and management of complex security policies a key component of the IPSec solution. Compliance with the IPSec specifications require the processing of various packet characteristics in order to ensure that proper processing is performed. Processing in accordance with IPSec specifications will begin with a determination of the source IP address (src) and the destination IP address (dst) to determine the action to be taken. IPSec specifications may then apply a given decryption to the data. For example, the IPSec specification may require that communications from a particular IP address be encrypted with DES (in cipher block chaining (CBC) and electronic codebook (ECB) modes) or triple DES (3DES) (CBC and ECB modes), descrambled with a hash based message authentication code such as, for example, HMAC-SHA1 authentication. The IP layer also identifies the transport protocol and the direction of data traffic. Normally, for packet filtering the action to be taken is either implied by design, or stored in a Security Association database in device RAM.

| Policy | src | dest | Protocol | Direction | Action |
|---|---|---|---|---|---|
| $SP_1$ | 128.89/16 | 10/8 | UDP | inbound | 3DES, HMAC-SHA1 |
| $SP_2$ | * | * | * | inbound | deny |

Application Layer: Real Time Protocol (RTP)

The application layer may also include a particular security processing. For example, voice packet are typically transported in accordance with the real time protocol (RTP). Processing of RTP packets is dependent upon what was done at the IP layer. Therefore, the action taken at the application layer will depend on the source address, the destination address etc. Normally, for packet filtering, the action to be taken will be stored in a per-session security association list.

| Policy | sre | dest | Protocol | Direction | Action |
|---|---|---|---|---|---|
| $SP_1$ | 128.89/16 | 10/8 | RTP | inbound | ARCFOUR, MME-MAC2 |
| $SP_2$ | * | * | * | inbound | deny |

Policy Convergence

Therefore, the security processing of typical multi-layer packet utilizes a certain amount of common selector information to define the appropriate security architecture. This selector information is typically either available at the establishment of a security association or derived from information within the header of each packet. In either case, it is not necessary to hold the entire packet to acquire this information. Rather, as the selector information is uncovered the configurable state machines that filter and process the incoming packets may be initialized.

The present invention may best be understood by examining typical applications of merged security processing. Therefore, the following examples illustrate security policies for typical applications of how these security protocols are used together. For example, the processing of a DOCSIS packet having IPSec applied may include the executions of the following policies.

| MPEG | | | | |
|---|---|---|---|---|
| Policy | TS | PID | Direction | Action |
| $SP_1$ | $TS_1$ | 0x1FFE | inbound | pass-thru |

| Baseline Privacy | | | | | |
|---|---|---|---|---|---|
| Policy | TS | SID | SAID | Direction | Action |
| $SP_1$ | $TS_1$ | * | SAID1 | inbound | BPI DES |

| IPSec | | | | | |
|---|---|---|---|---|---|
| Policy | sre | dest | Protocol | Direction | Action |
| $SP_1$ | 128.89/16 | 10/8 | UDP | inbound | 3DES, HMAC-SHA1 |

As the data packets are parsed, these policies are assessed in list order to apply proper security to the packet. For example, the MPEG frame identifies the number of transport streams and includes a PID identifying the packet as a DOCSIS packet so that packet is passed through an MPEG processing block without the need for security processing. An offset value contained in the MPEG frame may be used to find the MAC frames, The extracted MAC frames are passed to a MAC header processing block in a DES processor that provides baseline security by decrypting QAM downstream traffic in accordance with the security association identifier. The IP header may then be parsed to determine the source and destination addresses and the transport layer protocol to determine whether for example 3DES should be applied.

| Policy | TS | PID | SAID | src | dest | Prot | Dir | Action |
|---|---|---|---|---|---|---|---|---|
| $SP_1$ | $TS_1$ | 0x1FFE | SAID1 | 128.89/16 | 10/8 | UDP | in | MPEG: pass-thru<br>BPI: DES<br>IPSec: 3DES, HMAC-SHA1 |

A device packet filter enforcing these policies will compare the characteristics of a packet and values within a packet, against security policies known at the device. In some cases, policies are compared in order of their listing. Based on the findings of the comparison, the device will apply security to the packet as required. Therefore, in the described exemplary embodiment, the security processing may be initialized and executed as the necessary data is decrypted at the given packet layer. Packet filtering and processing is executed by a structure of configurable state machines that are configured according to the expected packet structure. However the state machines are sufficiently flexible to accept, in real time, packet inputs as configuration to adjust for optional packet structures, packet extensions, and header and field lengths. Inputs are also taken, in real time, from the packet structures to check against security policy, acquire keys and other parameters necessary to configure the security processors.

Figure 3:
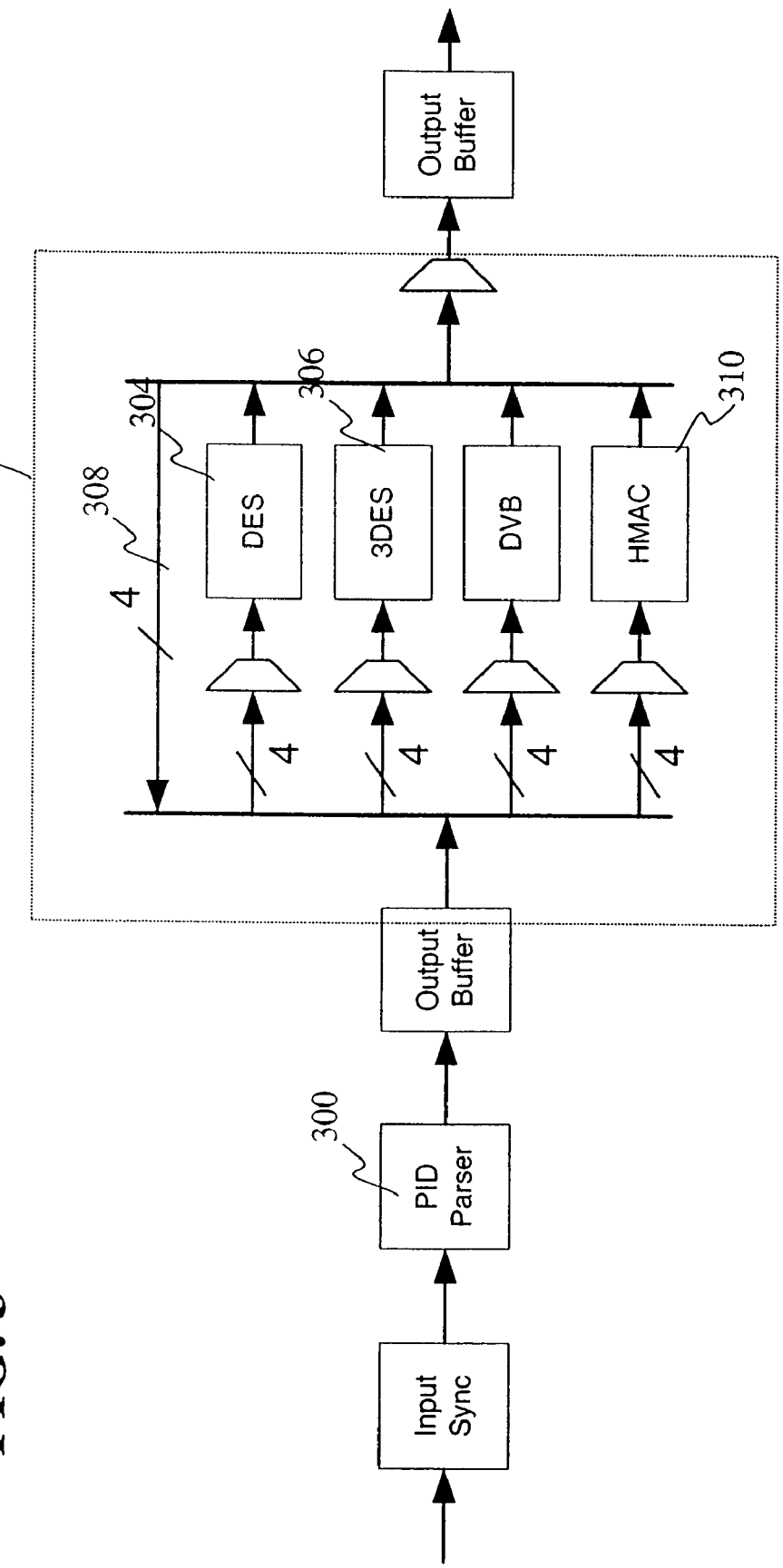
FIG. 3 is a block diagram of a packet security processor that performs parallel processing of multiple security policies in accordance with an exemplary embodiment of the present invention.

In the described exemplary embodiment, as the information is converged into a single front end processor, the characteristics of a packet and information within the header may be used to rapidly determine what policies need to be applied to an incoming data stream. In this example of a DOCSIS packet having IPSec applied, the MPEG frame is passed through, and BPI and IPSec decryption are applied. Further, each of the necessary state machines may be initialized as the necessary characteristics become available, to provide simultaneous parallel processing of the security policies applied at each layer. For example, referring to FIG. 3, an exemplary front end processor may includes a PID parser 300 that determines the packet identifier. The filter 302 may include a DES processor 304 that may be initially used at the BPI interface. When it is determined that IPSec encryption is included and 3DES encryption 306 is required, the initial bytes may be fedback 308 to the 3DES processor 306 in accordance with the control characteristics found in the packet. Further an HMAC state machine 310 may also provide authentication of the IP packet in parallel with the processing of the other security policies.

FIG. 4 illustrates how the protocol packets layer on themselves. In this example, an MPEG frame is a DOCSIS MAC frame with no conditional access encryption. The DOCSIS MAC frame 402 may contain type, length, key sequence, a security association identifier, etc. that is not encrypted. Therefore this information may be examined to determine if BPI encryption is included. In this case BPI encryption is included (shaded region 404). Encrypted user data begins at outer IP header 406 of the IP layer 408.

Figure 5:
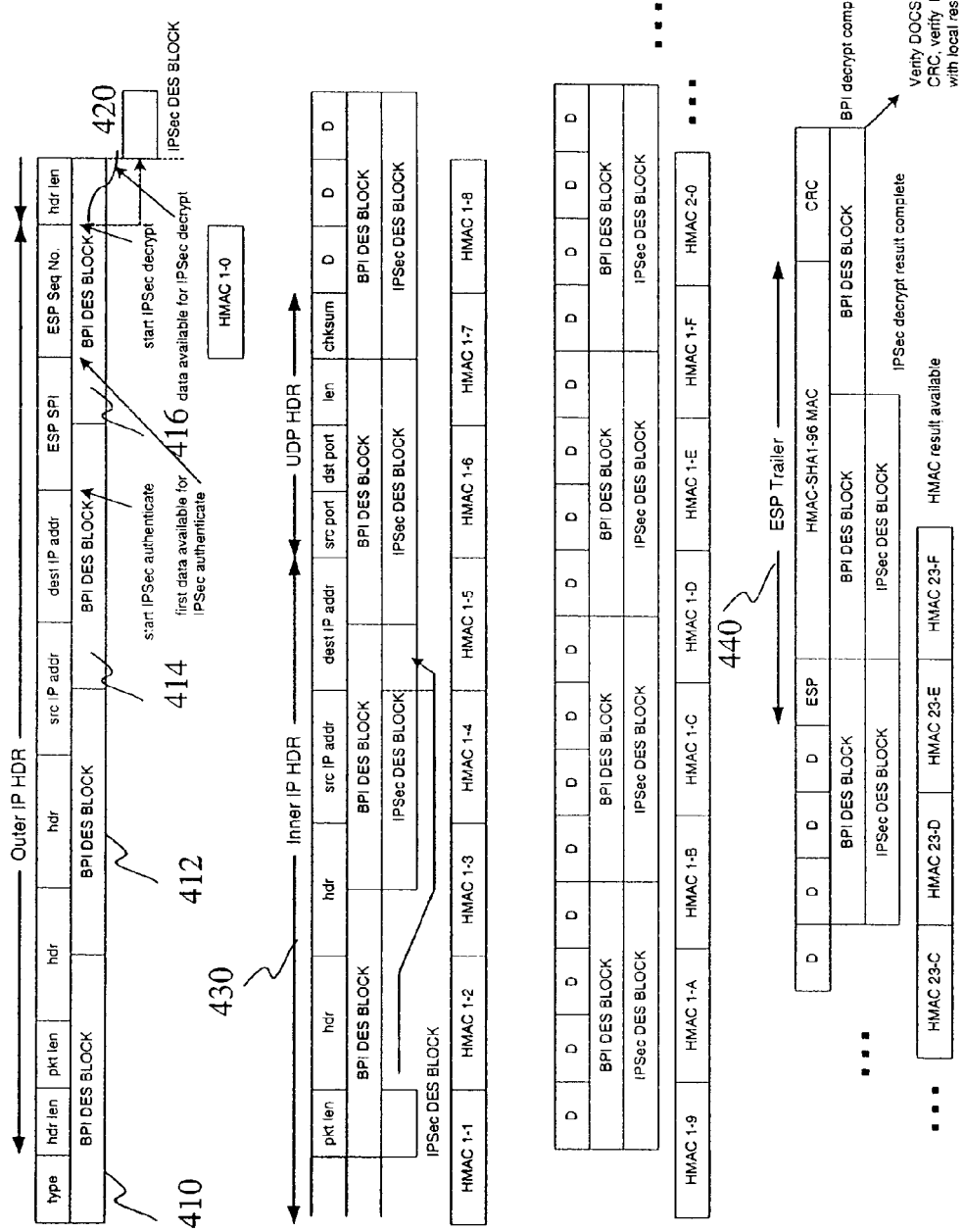
FIG. 5 is a graphical illustration of a method for parallel processing of the security policies applied to the packet in FIG. 4, in accordance with an exemplary embodiment of the present invention.

FIG. 5 illustrates in detail the BPI encrypted data. The outer IP header includes a plurality of characteristics such as type, header length and packet length that are included in the first BPI DES block 410. Thus as the first BPI DES block is decrypted a state machine may be initialized to process the IP packet that follows. As the next BPI DES block is decrypted 412 additional header information is available. Further, in this example, after the third BPI DES block 414 is decrypted the source and destination IP addresses are known from which it may be determined if IPSec has been applied. In addition, after the fourth BPI DES block 416 is decrypted all of the information required to begin IPSec is available and IPSec processing 420 immediately begins.

Therefore, on the inner IP header 430 parallel processing of bytes is performed where bytes that have been encrypted twice, first by IPSec and then by BPI are now decrypted twice first by BPI then by IPSec. In addition, HMAC authentication is performed in parallel over the entire IP packet in 32 bit blocks. When the trailer 440 has been decrypted, HMAC authentication may be checked against the HMAC included in the trailer of the IP packet. In addition a cyclic redundancy check may also be performed in parallel. Thus, in this example, BPI and IPSec decryption have been accomplished with only one pass through an integrated processor. In contrast conventional systems process each security policy in series, completing the BPI decryption in its entirety before initiating the processing of the security policy applied in the next layer. Thus the present invention provides increased efficiency with reduced latency as compared to conventional security processors.

For example, referring to FIG. 6 the flow of a conventional security processing system is illustrated where, if required, a DOCSIS MAC 450 will typically perform BPI decryption in hardware; the data is then placed in memory 452 via an internal system bus. A CPU 454 may then forward the data to a PC interfaced with the cable modem. However, if security processing such as IPSec is required, the CPU 454 examines the data to determine what processing is required and then places the data back into memory 452. The data may then be passed to a security co-processor 456 that serially processes the various security protocols. The processed data is then again placed back into memory 452 to be output to a connected peripheral.

In the described exemplary embodiment of the present invention, data from the DOCSIS MAC 480 is forwarded to the integrated front end packet security processor 482 where security processing may be executed as previously described in a parallel fashion. In this example the front end processor would merge the DOCSIS MAC BPI DES and the IPSec 3DES/HMAC processes along with the controls required to perform IPSec to provide converged security processing of the entire packet. When the security processing is complete for each layer of the packet, the processed data may then be placed in memory 484 for the first and only time.

Integrated processing of multiple security policies may be complicated if IP fragmentation is allowed. As is known in the art, IP fragmentation may occur when transmitting variable length data packets as a set of fixed length packets. For example, additional header information may be appended to an IP frame when IPSec encryption is performed. The IPSec packets transmitted over an Ethernet are then divided into predetermined packet sizes such as for example 1500 byte Ethernet packets. Therefore, the IP packet may have to be transmitted in multiple Ethernet packets. In this instance the integrated front end packet security processor may not be able to efficiently complete processing if packets are received out of order, or one of a plurality of Ethernet packets are delayed.

Therefore, fragmented packets may be passed on without executing security policies for IPSec and above. This fact can be tagged along with the data packets and the upper layer software modules can perform any needed processing. However, IP fragmentation in properly designed systems is very rare. In fact, in DOCSIS the IP packets are typically designed to be equal to or smaller than the Ethernet packet to avoid fragmentation entirely.

A further example illustrating integrated processing of multiple security policies is shown below for a voice over IP (VoIP) packet transmitted in accordance with PacketCable standards having media stream security. The processing of a VOIP packet with media stream security includes the execution of the following policies:

| MPEG | | | | |
|---|---|---|---|---|
| Policy | TS | PID | Direction | Action |
| $SP_1$ | $TS_1$ | 0x1FFE | inbound | pass-thru. |

| Baseline Privacy | | | | | |
|---|---|---|---|---|---|
| Policy | TS | SID | SAID | Direction | Action |
| $SP_1$ | $TS_1$ | * | $SAID_1$ | inbound | BPI DES |

| PacketCable Media Stream (RTP) | | | | | |
|---|---|---|---|---|---|
| Policy | src | dest | Protocol | Direction | Action |
| $SP_1$ | 128.89/16 | 10/8 | RTP | inbound | ARCFOUR, MMH-MAC2 |
| $SP_2$ | * | * | * | inbound | deny |

Note that MMH refers to the Multilayer Modular Hashing Process, part of the Packet Cable VoIP Specification.

In the described exemplary embodiment, as the data packets are parsed, the security policies are assessed in list order to apply proper security to the packet. Alternatively, the policies may be assessed as a single policy as the data is received and the packets transferred.

frame 502 may contain type, length, key sequence, a security association identifier, etc. that is not encrypted. Therefore this information may be examined to determine if BPI encryption is included. In this case, BPI encryption is included (region 504). Encrypted user data begins at outer IP header 506 of the IP layer. However, in this application IPSec is not applied, and the next layer of encryption is the RTP encryption at the application layer.

FIG. 8 illustrates in detail merged security policy processing for a VoIP packet with media stream security. In this instance, packet characteristics are again examined as the bytes are decrypted. For example, the SAID in the DOCSIS MAC frame may be read to initiate BPI decryption 520. As the IP header is processed, the header length 522 and packet length 524 may be read and forwarded to a state machine to parse the remaining bytes of the packet. In this instance the converged packet security processor reads the source and destination IP addresses, 526 and 528 respectively, when available to determine if IPSec has been applied. Further, when decrypted the converged processor examines the source and destination ports 530 and 532 in the transport layer to determine what security policy if any was applied in the application layer (in this example PacketCable RTP). The processor may then read the packet length 536 to parse the packet and perform a checksum verification 540 of the packet integrity before proceeding to descramble and process the RTP header and payload.

The described exemplary security processor may initiate RTP authentication at the beginning of the RTP header 550. Further, when BPI decryption permits, the processor reads the timestamp 552 to configure the Packet Cable key for ARC-4/ MMH processing. RTP decryption may begin in accordance with the uncovered key at the beginning of the RTP payload 554. Parallel processing of BPI DES, RTP authentication and RTP decryption may then proceed until the end of the RTP payload at which point the processor verifies the MAC 556 and performs a checksum of the RTP packet 558. FIG. 9 further demonstrates the parallel processing of the multiple security policies.

FIG. 10 illustrates the flow of a conventional security processing system where a DOCSIS MAC 600 performs BPI decryption in hardware and places the descrambled data in memory 602 via an internal system bus. A CPU 604 then examines the data to determine what processing is required and then serially processes the various security protocols (in this case, ARC4 decryption with MMH authentication). The processed data is then again placed back into memory 602 to

| Policy | TS | PID | SAID | src | dest | port | Prot | Dir | Action |
|---|---|---|---|---|---|---|---|---|---|
| $SP_1$ | $TS_1$ | 0x1FFE | $SAID_1$ | 128.89/16 | 10/8 | x | RTP | inbound | MPEG: pass-thru BPI: DES RTP: ARC4, MMH-MAC2 |

ARC4 requires special considerations when used as defined in the PacketCable specifications. Each session will have a separately pre-generated keystream that is adjusted with the RTP timestamp from its initialization timestamp value. Therefore, keystream will be maintained for each call session.

FIG. 7 illustrates how the protocols layer on themselves. In this example, MPEG frame 500 is a DOCSIS MAC frame with no conditional access encryption. The DOCSIS MAC be further processed by the voice and data processor prior to being output to a connected telephony device.

In the described exemplary embodiment of the invention, data from the DOCSIS MAC 620 is forwarded to the integrated front end packet security processor 622 where security processing may be executed as previously described in a parallel fashion. In this example the front end processor merges the DOCSIS MAC BPI DES and the RTP ARC4/

HHM along with the controls required to perform the RTP decryption and authentication to provide converged security processing of the entire packet. When the security processing is complete for each layer of the packet, the processed data may then be placed in memory 624 for the first and only time.

Although a preferred embodiment of the present invention has been described, it should not be construed to limit the scope of the present invention.

Those skilled in the art will understand that various modifications may be made to the described embodiment. For example, the present invention may be used to more efficiently perform alternative packet processing functions that are typically performed in a serial manner over a plurality of layers. For the example of a VoIP packet, RTP data processing could be readily implemented in the merged front end processor to decode the RTP data in parallel with the security decryption. Further, the present invention is not limited to client or destination side parallel processing/decryption of multiple security policies. Rather, the present invention, may be used on the source side to perform parallel encryption and authentication of multiple security policies at a plurality of layers, such as, for example, the MAC/data-link layer, the network layer (e.g. Internet Protocol), the transport layer or the application layer. In addition, while packets are being processed, at either the source or destination, either encryption or decryption, or both may be applied to the packets.

An illustration of parallel decryption and encryption, executed at a destination device, is shown below for IP Video on DOCSIS network, with MPEG encryption. The IP video is sent using MPEG over RTP. In addition to the application of DOCSIS Baseline Privacy encryption, both the RTP and MPEG packets are encrypted. Once the MPEG packets are decrypted, they are to be re-encrypted according to local policy and stored on local a hard disk drive. The processing of IP video being sent on a DOCSIS link with local encryption includes the execution of the following policies:

| MPEG | | | | |
|---|---|---|---|---|
| Policy | TS | PID | Direction | Action |
| SP$_1$ | TS$_1$ | 0x1FFE | inbound | pass-thru |

| Baseline Privacy | | | | | |
|---|---|---|---|---|---|
| Policy | TS | SID | SAID | Direction | Action |
| SP$_1$ | TS$_1$ | * | SAID$_1$ | inbound | BPI DES |

-continued

| IP | | | | | |
|---|---|---|---|---|---|
| Policy | src | dest | Protocol | Direction | Action |
| SP$_1$ | 128.89/16 | 10/8 | UDP | inbound | pass-thru |

| Media Stream (RTP) | | | | | |
|---|---|---|---|---|---|
| Policy | src | dest | Protocol | Direction | Action |
| SP$_1$ | 128.89/16 | 10/8 | RTP | inbound | 3DES |
| SP$_2$ | * | * | * | inbound | deny |

| MPEG | | | | |
|---|---|---|---|---|
| Policy | TS | PID | Direction | Action |
| SP$_1$ | X | * | inbound | 3DES decrypt<br>AES encrypt (local key)<br>Route to Hard Disk Drive |

In the described exemplary embodiment, as the data packets are parsed, the security policies are assessed in list order to apply proper security to the packet. Alternatively, the policies may be assessed as a single policy as the data is received and the packets transferred.

| Policy | TS | PID | SAID | src | dest | port | Prot | Dir | Action |
|---|---|---|---|---|---|---|---|---|---|
| SP$_1$ | TS$_1$ | 0x1FFE | SAID$_1$ | 128.89/16 | 10/8 | x | RTP | in | MPEG: pass-thru<br>BPI: DES decrypt<br>IP: pass-thru<br>RTP: 3DES decrypt<br>MPEG: 3DES decrypt<br>MPEG: 3DES encrypt |

FIG. 11 illustrates how the protocols layer on themselves. In this second illustrative example, the MPEG frame 700 is a DOCSIS MAC frame with no conditional access encryption. The DOCSIS MAC frame 702 may contain type, length, key sequence, a security association identifier, etc. that is not encrypted. Therefore this information may be examined to determine if BPI encryption is included. In this case BPI encryption is included (region 704), Encrypted user data begins at the outer IP header 706 of the IP layer. However, in this application IPSec is not applied, and the next layer of encryption is the RTP encryption at the application layer and MPEG encryption.

FIG. 12 illustrates in detail merged security policy processing for a streaming video packet with media stream security. In this instance packet characteristics are again examined as the bytes are decrypted. For example, the SAID in the DOCSIS MAC frame may be read to initiate BPI decryption 720. As the IP header is processed, the header length 722 and packet length 724 may be read and forwarded to a state machine to parse the remaining bytes of the packet. In this instance the converged packet security processor reads the source and destination IP addresses, 726 and 728 respectively, when available to determine if IPSec has been applied. Further, when decrypted, the converged processor examines the source and destination ports 730 and 732 in the transport layer to determine what security policy if any was applied in the application layer (in this example RTP). The processor may then read the packet length 736 to parse the packet and perform a checksum verification 740 of the packet integrity before proceeding to descramble and process the RTP header and payload.

RTP decryption may begin at the beginning of the RTP header in accordance with the information, such as the src address, typically located in the IP header. When RTP decrypted, the MPEG PID may be ascertained (756) and MPEG decryption started at 758. MPEG re-encryption may begin in accordance with the uncovered PID at the beginning of the data payload. Parallel processing of the BPI DES, RTP decryption, MPEG decryption and MPEG re-encryption may then proceed until the end of the payload at which point the processor verifies the authentication code 760 and performs a checksum of the RTP packet at 762.

FIG. 13 further demonstrates the parallel processing of the multiple security policies in conjunction with the re-encryption of the MPEG data that may then be stored on a local hard disk drive in accordance with local policy.

Moreover, to those skilled in the various arts, the invention itself herein will suggest solutions to other tasks and adaptations for other applications. It is applicant's intention to cover by claims all such uses of the invention and those changes and modifications that could be made to the embodiments of the invention herein chosen for the purpose of disclosure without departing from the spirit and scope of the invention. One of skill in the art will appreciate that the present invention is not limited to the disclosed packet security processor. Rather, the present invention may be used to merge additional processing features into a single front end processing block.

What is claimed is:

1. A method of processing a wirelessly-received data packet having a plurality of layers, comprising:

processing a first layer in accordance with a first protocol; and processing a second layer in accordance with a second protocol in parallel with processing of said first layer when processing of said first layers uncovers sufficient information to support processing of said second layer.

2. A method of processing a wirelessly-received data packet according to a plurality of security policies, comprising the steps of:

(a) receiving the packet;
(b) identifying a first security policy;
(c) processing the packet according to the first security policy;
(d) identifying a second security policy when information associated with said identification of the second security policy becomes available; and
(e) processing the packet according to the second security policy, concurrently with step (c).

3. The method of claim 2, wherein said step (c) comprises decryption of data in the packet.

4. The method of claim 3, wherein said decryption is performed according to the data encryption standard (DES).

5. The method of claim 3, wherein said decryption is performed according to the triple data encryption standard (3DES).

6. The method of claim 3, wherein said decryption is performed according to the ARC4 algorithm.

7. The method of claim 2, wherein said step (e) comprises decryption of data in the packet.

8. The method of claim 7, wherein said decryption is performed according to the DES.

9. The method of claim 7, wherein said decryption is performed according to the 3DES.

10. The method of claim 7, wherein said decryption is performed according to the ARC4 standard.

11. The method of claim 2, wherein said step (e) comprises authentication of the data packet.

12. The method of claim 11, wherein said authentication comprises application of the Multilinear Modular Hashing (MMH) algorithm.

13. The method of claim 11, wherein said authentication comprises application of the Hash-based Message Authentication Code (HMAC) Secure Hash Algorithm (SHA)-1.

14. The method of claim 2, wherein said step (e) comprises re-encryption of decrypted data from the packet.

15. The method of claim 14, wherein said re-encryption comprises encryption performed according to the Advanced Encryption Standard (AES).

* * * * *